Patented Feb. 29, 1944

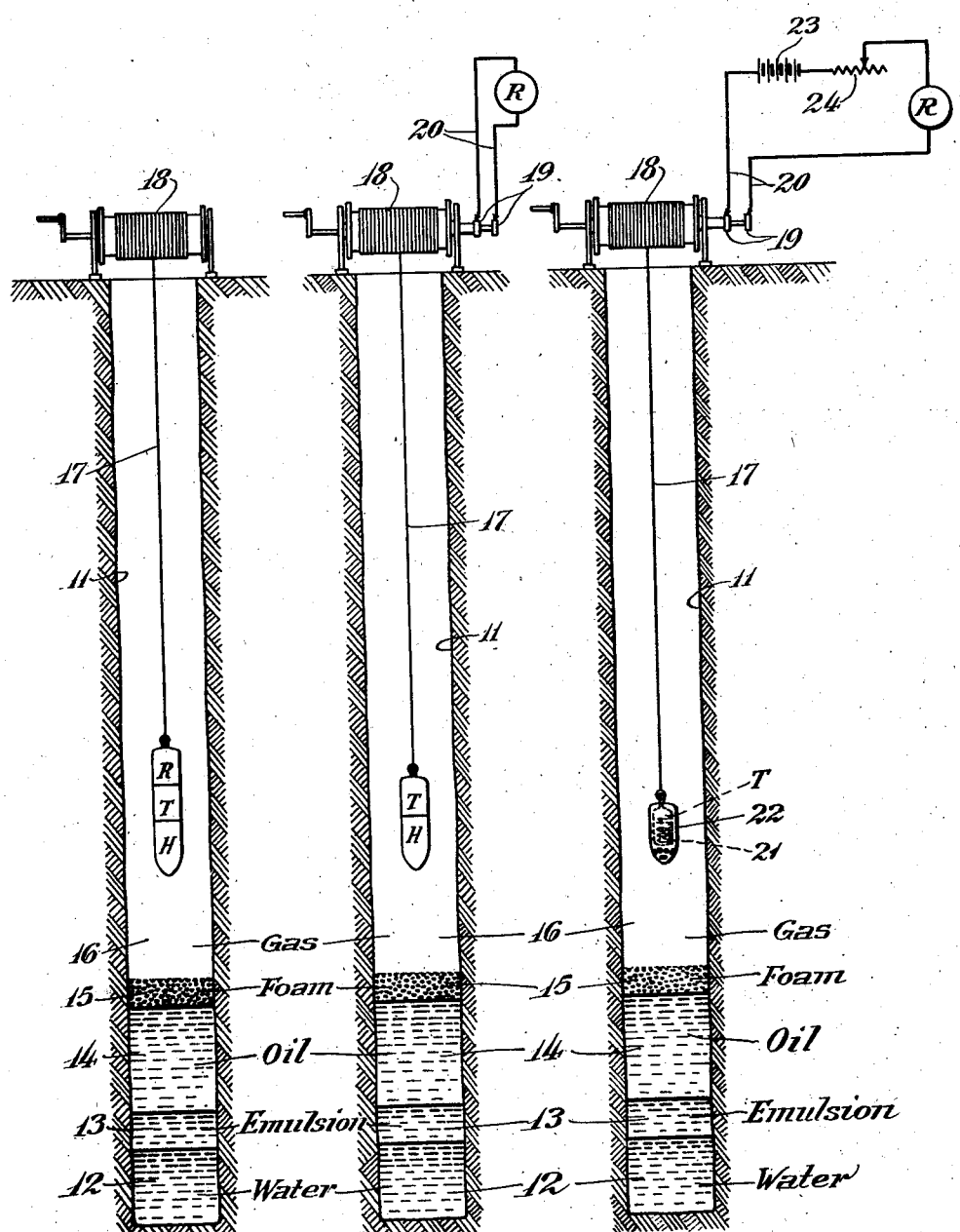

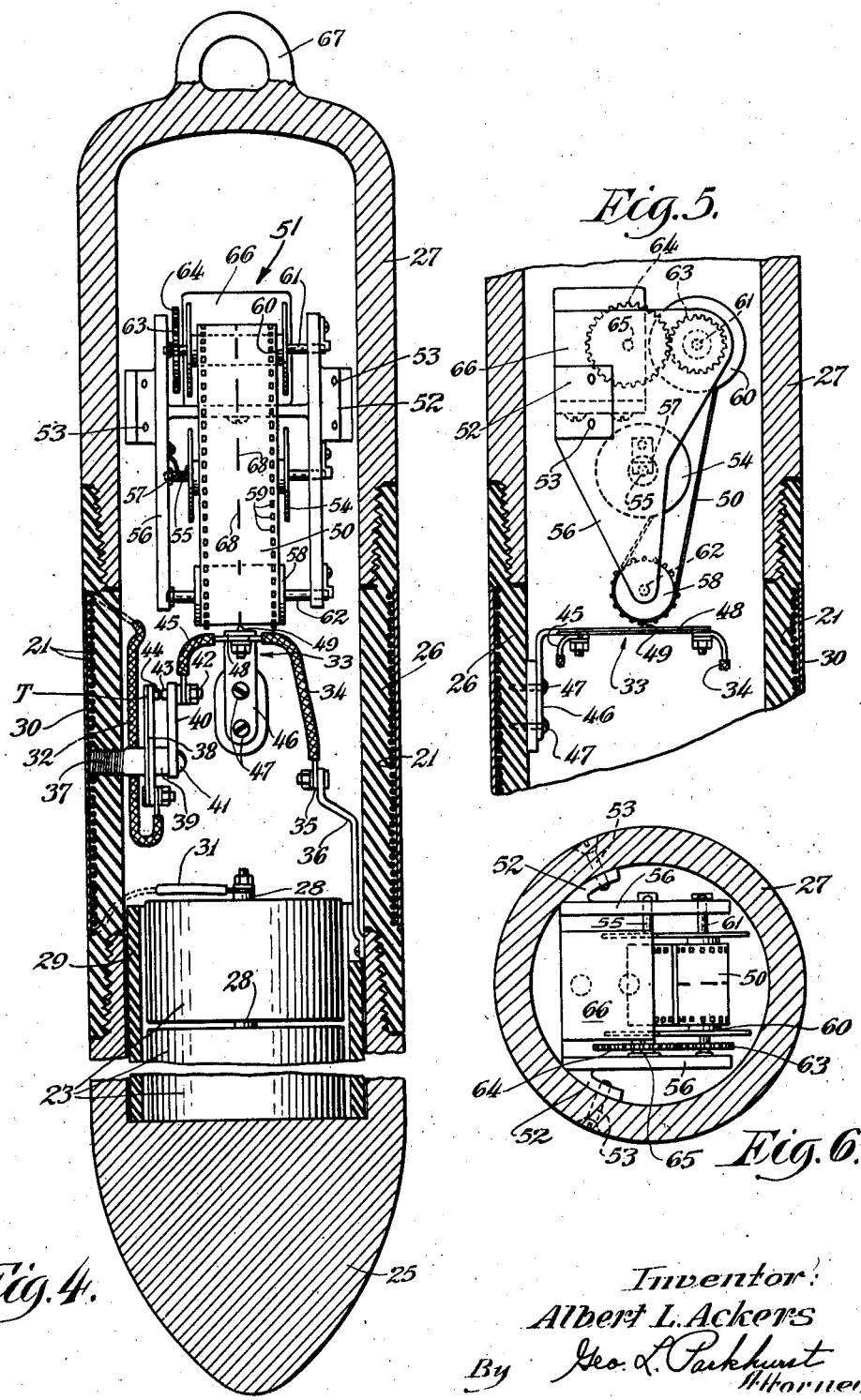

2,342,827

UNITED STATES PATENT OFFICE 2,342,827

APPARATUS FOR WELL LOGGING

Albert L. Ackers, Tulsa, Okla., assignor to Stanolind Oil and Gas Company, Tulsa, Okla., a corporation of Delaware Application June 28, 1940, Serial No. 343,003

8 Claims. (Cl. 73—51)

This invention relates to apparatus for well logging and particularly to apparatus for locating interfaces, notably fluid interfaces, within wells. It also has other applications as will hereinafter appear.

Many procedures are known to the art for the logging of wells either to determine the fluid interfaces within the well or to determine the nature of and interfaces between the rock strata traversed by the well. Amongst such methods is the measurement of the temperature continuously throughout the depth of a well or a part thereof or at spaced points. This procedure is used in particular to locate the position of cement following a cementing operation. It is also known to subject the contents of a well to more or less uniform heating throughout its length and thereafter to measure the relationship between temperature and depth in order to determine information of the type to which reference has previously been made.

However, these heretofore known methods of thermal logging are subject to serious disadvantages. The simple method of determining temperature as a function of depth gives relatively little information except in such special cases as the location of cement. The method in which uniform heating is applied throughout the length of the well or of the portion of the length which is of interest, followed by determination of temperature as a function of depth involves complicated and expensive techniques.

It is an object of my invention to provide apparatus for thermal logging, for any purpose, which will give information of greater value than that obtainable by simple measurement of temperature as a function of depth and which will be simple and expeditious as compared with other apparatus heretofore used. It is likewise, more particularly, an object of my invention to provide apparatus particularly adapted to the facile and accurate determination of fluid interfaces in a well.

A still further object of my invention is to provide apparatus of the type described which will not only give information concerning the interfaces but also information concerning the types of fluid or other material disposed on either side of such interfaces.

Other and more detailed objects, advantages and uses of my invention will become apparent as the description thereof proceeds.

In brief I contemplate the localized heating of the fluids present in a well and the control of such heating thermostatically so as to maintain the fluids adjacent to my apparatus, or to maintain a portion of my apparatus in thermal communication with such fluids, at an approximately constant temperature, together with the measurement of some parameter of the energy input necessary to maintain this temperature.

My invention will be further described in connection with certain specific embodiments thereof as shown in the accompanying drawings which form a part of this specification and in which like or corresponding parts are provided with like reference characters. In the drawings:

Figure 1 as a vertical section illustrating diagrammatically one form of my apparatus;

Figure 2 is a corresponding vertical section illustrating diagrammatically a second form of my apparatus;

Figure 3 is a corresponding vertical section showing diagrammatically a still further embodiment of my invention;

Figure 4 is a cross section showing in detail one embodiment of apparatus in accordance with my invention;

Figure 5 is a vertical section showing a side elevation of part of the mechanism illustrated in Figure 4; and Figure 6 is a horizontal section showing in plan view the mechanism illustrated in Figure 5.

In general my apparatus as shown in Figures 1, 2 and 3 consists of three principal parts; namely, a heater H (for instance a battery and heating coil), a thermostat T and an indicating device or recorder R responsive to some parameter of the energy input.

Turning more particularly to Figure 1, well 11 contains a number of superimposed fluid colums including water 12, oil-water emulsion 13, oil 14, foam 15 and gas 16. It will be understood, of course, that in many instances one or more of these fluid columns will not be present. Thus in many instances gas will be in direct contact with oil without an intervening layer of foam and similarly the emulsion layer will sometimes be lacking. However, my invention has the great advantage that it can detect layers such as these which in many forms of prior art apparatus cannot be measured. Also my invention is applicable to simpler systems, for instance to the mere determination of the interface between water and air or water and oil in a well or in a tank or elsewhere.

In Figure 1 heater H, thermostat T and recorder R are embodied in a single unit, which can be of the type shown in detail in Figure 4, and this unit is lowered and raised within the well by means of cable 17 and hoist 18. A record is made during either the downward or the upward progress of the instrument or both.

Since the heat capacities of the various fluids are very different and since thermostat T controls the heating in order to give a substantially constant temperature in the fluids adjacent to the device, the operation of this thermostat T is dependent upon the fluid in which the heater H and the rest of the apparatus are immersed. Thus when the apparatus is immersed in oil the thermostat will operate either more frequently or over longer periods or both than when the apparatus is immersed in gas and when the apparatus is immersed in water the heating will be more frequent or over longer periods or both as compared with oil. An oil-gas foam will, of course, generally have characteristics intermediate between those of oil and gas and an oil-water emulsion will similarly have characteristics intermediate between those of water and oil.

Thus by controlling the operation of heater H in accordance with thermostat T and then measuring some parameter of the energy input an indication is obtained as to the character of the fluids in which the apparatus is immersed. The parameter of energy input can be, for instance, the frequency of operation of the thermostatic switch (in this case recorder R can be simply a counter) or the parameter can be the length of time the heater H is operated (in which event recorder R can be of the type illustrated in Figure 4) or the total energy input itself can be measured and integrated over short lengths of time during the upward or downward progress of the apparatus within the well.

It will be understood, of course, that other characteristics of the fluid in addition to heat capacity will have an influence. Thus viscosity, vapor pressure, density, etc., are all factors of some significance but in any event the energy input per unit time as a function of depth or any parameter of energy input per unit time as a function of depth provides an indication of the character of the fluids in which the apparatus and in particular heater H and thermostat T are immersed. The apparatus can be calibrated by applying it under known conditions.

While one of the principal uses of my apparatus is in determining fluid levels as well as information concerning the nature of these fluids, the apparatus has other uses. Thus, the nature of the walls of an uncased well has an effect on the amount of energy input required to maintain a constant temperature and my invention can therefore be applied to the determination of information concerning geological formations traversed by the well as well as information concerning the location of cement, etc. In practicing this phase of my invention, the well will usually be filled uniformly with drilling mud or other fluid and my apparatus will then traverse the well, preferably at a constant rate while making measurements of the type previously described.

Instead of putting the complete apparatus within the well as shown in Figure 1, an indicating or recording device, for instance recorder R, can be located at the top of the well in order to permit the operator to observe the results of the logging operation during the course of this operation rather than being forced to await its completion. In Figure 2 heater H and thermostat T are raised and lowered within the well by means of hoist 18 and cable 17 but in this case cable 17 is a two-conductor cable and the conductors lead through slip rings 19 and wires 20 to a recorder R.

As shown in Figure 3, a minimum amount of apparatus can be placed within the well by using resistance heater 21 and thermostat switch T in a casing 22, open to fluid penetration, which is lowered and raised in the well 11 and then connecting these elements in an electric circuit via two-conductor cable 17, slip rings 19 and wires 20 to an above-ground circuit including battery 23, variable resistance 24 (if desired) and recorder R (which, in this instance, can suitably be a recording ammeter).

Figure 4 shows in more detail one specific embodiment of my invention corresponding generally to Figure 1. A casing which can suitably be four or five inches in diameter or of other size depending on the diameter of the well and from a foot or two to ten or twenty feet long, is made up of a lower section 25, a middle section 26 and an upper section 27 which can be tapped and threaded or otherwise arranged for removable attachment to each other.

Lower section 25 which is shown in cross-section is hollow and contains a battery or preferably a pile of batteries 23 which can suitably be of the type having upper terminals 28 and metallic bottoms serving as the other terminals. These batteries can be kept out of contact with lower casing section 25 by means of insulation 29.

Central section 26 is preferably made of Bakelite, other plastic or other thermal insulating material and contains near its outer surface insulated heating coil 21. This insulated heating coil can be overlain by a metallic sleeve 30 with which it is preferably in contact. The electrical circuit goes from the top terminal 28 of the top battery 23 through insulated cable 31 and heating coil 21 and thence back by means of insulated cable 32 through thermostat T and part of the recording apparatus 33 (which will be described later) and thence through cable 34, connector 35 and bracket 36 to the lower casing section 25 which can suitably be made of metal. The circuit is completed through this lower casing section itself to the bottom terminal of the lowermost battery 23.

Screwing into an aperture in the central casing section 26 is a metallic plug 37 which is in contact with the metallic sleeve 30 and which abuts against a bimetallic element 38 forming a portion of thermostat T. On the other side of this bimetallic strip is spacer 39 which can be made either of metal or insulating material and beyond it is a contact carrier 40 made of Bakelite or other insulating material. The contact carrier 40, spacer 39, bimetallic strip 38 and plug 37 are clamped together by means of cap screw 41. Through the upper end of contact carrier 40 passes a metallic member 42 of which the left end is contact 43 cooperating with a similar contact 44 carried by bimetallic strip 38. From the right end of metallic member 42 insulated cable 45 leads to recording element 33 which is carried by bracket 46 affixed by means of cap screws 47 to central casing section 26. This recording element 33 is of the type in which a bimetallic strip 48 (best seen in Figure 5) is heated by the current flowing through and causes an indicating element 49 which can be simply a contact point to rise and fall when heated and cooled.

From this recording element the circuit is completed back to batteries 23 as previously described.

In operation batteries 23 and heating coil 21 serve to increase the temperature of the fluids in which the apparatus is immersed to some previously determined temperature which can suitably be from a degree or two to as much as 25 or 50° F. above the temperature of the surrounding fluids. Plug 37 being in good thermal contact with the surrounding fluids and being also in thermal contact with bimetallic strip 38 causes that bimetallic strip to operate, opening contacts 43 and 44 when the desired temperature is reached. As cooling takes place, this bimetallic strip again functions, the contacts close and heating is resumed. When heating is taking place point 49 associated with recorder element 33 is raised into operative position and bears upon a film or paper strip 50 which can suitably be of the normal 35 mm. type. This point can be a pencil or pen point recording on paper or can be a metallic contact point making an impression on a waxed surface.

Film or strip 50 is carried by a recording assembly 51 which is affixed to upper section 27 by brackets 52 and cap screws 53. The film or strip is originally carried on drum 54 which is in turn mounted on axle 55 journaled in supporting frame 56 which can suitably be integral with brackets 52 as shown. The strip 50 is kept under tension by spring 57 bearing on axle 55. From drum or spool 54 the film passes over sprocket spool or drum 58, the sprockets of which cooperate with apertures 59 (Figure 4) in the film or strip 50. The central portion of this sprocket spool is a smooth drum which permits recording element 49 to assert pressure on the film or strip at the bottom of the drum. From this sprocket spool the film or strip 50 passes to flanged spool or drum 60 onto which it is wound. This spool or drum 60 can be equipped with a slot of the type customary in cameras to create friction between the film or strip and the drum. Drum or spool 60 is carried by an axle 61 which, like axles 55 and 62 associated with drums 54 and 58 respectively, is journaled in supporting frame 56. Axle 61 carries a gear 63 which is meshed with another gear 64 carried by another axle 65 likewise journaled in supporting frame 56 and this axle 65 is driven by a spring motor 66 shown diagrammatically.

Thus spring motor 66 drives gear 64 which in turn drives gear 63 and drum 60 which winds the film or strip 50 at a uniform rate from drum or spool 54 over sprocket drum 58 and onto spool or drum 60 from which it can be removed after the operation is completed.

At the top of upper casing section 27 is an eye 67 to which a wire line can be attached.

To operate the device the thermostat is set to operate at a temperature slightly higher than the highest temperature which it is expected to encounter, motor 66 is started and the device is then slowly lowered within the well at uniform speed, observing its depth as a function of time by the use of conventional apparatus not shown. Since this motor operates at constant speed a record of the operation of the thermostat as a function of time, convertible to a function of depth is obtained. It will be understood, of course, that various other methods of plotting the action of this thermostat or other parameter of energy input directly against depth can be used as are well known in other logging operations.

By observing either the average number of operations of the thermostat per unit of depth (the number of marks 68 on film or strip 50) at various depths, or by similarly measuring the portion of the time the heater is in operation (the average length of marks 68) at various depth intervals, or preferably by making both observations, information can be secured concerning the character of the fluids in which the apparatus is immersed since in general as the heat capacity (and other properties which necessitate a higher heat input to maintain a given temperature) increases in value, the number of operations of the thermostat, or the length of time the thermostat switch is closed in each cycle, or both, are increased.

Instead of making continuous readings or recordings while the apparatus is continuously raised or lowered, readings or recordings can be made while the apparatus is stationary at various levels. In any event the levels at which the relative heat capacities of the fluids within the well undergo sharp transitions are determined.

As previously described, if the fluid in the well is uniform the apparatus can be used in the same manner to determine the presence of cement, the location of geological interfaces or other information relevant to the surrounding materials.

It will, of course, be recognized that the temperature of the fluids within the well and of the materials in contact with them will vary to some extent. Thus, the temperature usually undergoes a gradual increase with depth. While this affects the energy input required to maintain the well fluids at the chosen temperature of operation of the thermostat switch such temperature gradients are normally very gradual and do not interfere with obtaining sharp changes in energy input, or a parameter thereof, indicative of fluid or other interfaces.

While I have described my invention in connection with certain specific embodiments thereof, it is to be understood that these are by way of illustration and not by way of limitation and I do not mean to be restricted thereby but only to the scope of the appended claims.

I claim:

1. Apparatus for locating a fluid interface, comprising means for heating fluids in which said apparatus is immersed, means for controlling said heating to maintain a substantially constant temperature, means for measuring a parameter of the energy input necessary to maintain said substantially constant temperature, and means for raising and lowering said heating means and said temperature control means.

2. Apparatus for logging a fluid-containing well comprising means adapted to be lowered into said well for the localized heating of the fluids present in said well, thermostatic means for controlling said heating to maintain a substantially constant temperature, and means for measuring a parameter of the energy input necessary to maintain said substantially constant temperature.

3. Apparatus for logging a fluid-containing well comprising localized means in said well for heating the fluids present in said well, thermostatic means for controlling said heating to maintain a substantially constant temperature, means for measuring a parameter of the energy input necessary to maintain said substantially constant temperature, and means for raising and lowering said heating means and said thermostatic means within said well.

4. Apparatus for logging a fluid-containing well comprising means adapted to be lowered into said well for the localized heating of the fluids present in said well, thermostatic means for controlling said heating to maintain a substantially constant temperature, and means responsive to the operation of said thermostatic means for measuring a parameter of the energy input necessary to maintain said substantially constant temperature.

5. Apparatus for logging a fluid-containing well comprising means adapted to be lowered into said well for the localized heating of the fluids present in said well, thermostatic means thermally insulated from said heating means and responsive to the temperature of said heated well fluids for controlling said heating to maintain a substantially constant temperature, and means for measuring a parameter of the energy input necessary to maintain said substantially constant temperature.

6. Apparatus for logging a fluid-containing well comprising a casing adapted to be lowered into said well, a heater on said casing for heating a restricted portion of the fluids present in said well, thermostatic means in said casing located adjacent to said heater and responsive to the temperature of the heated well fluids for controlling said heating to maintain the temperature of said heated well fluids substantially constant, and means responsive to the operation of said thermostatic means for measuring a parameter of the energy input necessary to maintain said substantially constant temperature.

7. Apparatus for logging a fluid-containing well comprising a casing adapted to be lowered into said well, a heater on said casing for heating a restricted portion of the fluids present in said well, thermostatic means in said casing located adjacent to said heater and responsive to the temperature of the heated well fluids for controlling said heating to maintain the temperature of said heated well fluids substantially constant, means responsive to the operation of said thermostatic means for measuring a parameter of the energy input necessary to maintain said substantially constant temperature, and means for raising and lowering said heating means and said thermostatic means within said well.

8. Apparatus for logging a fluid-containing well comprising a casing adapted to be lowered into said well, a heater on said casing for heating a restricted portion of the fluids present in said well, thermostatic means in said casing located adjacent to said heater for controlling the energy input to said heater, means comprising a portion of said casing for shielding said thermostatic means from direct heating by said heater, means in said casing for conveying heat from the heated well fluids to said thermostatic means, and means for measuring a parameter of energy input to said heater.

ALBERT L. ACKERS.